United States Patent
Meese et al.

(10) Patent No.: US 12,145,197 B2
(45) Date of Patent: Nov. 19, 2024

(54) TILTING MELTING HEARTH SYSTEM AND METHOD FOR RECYCLING METAL

(71) Applicant: Continuum Powders Corporation, Cloverdale, CA (US)

(72) Inventors: Paul Meese, Healdsburg, CA (US); Matthew Charles, Cloverdale, CA (US); Sonia Zacher, Cloverdale, CA (US); Daniel Mendez, Healdsburg, CA (US); Jeff McIntire, Castro Valley, CA (US)

(73) Assignee: Continuum Powders Corporation, Cloverdale, CA (US)

( * ) Notice: Subject to any disclaimer, the term of this patent is extended or adjusted under 35 U.S.C. 154(b) by 76 days.

(21) Appl. No.: 17/976,755

(22) Filed: Oct. 29, 2022

(65) Prior Publication Data

US 2023/0139976 A1 May 4, 2023

Related U.S. Application Data

(60) Provisional application No. 63/273,291, filed on Oct. 29, 2021.

(51) Int. Cl.
| | |
|---|---|
| B22D 41/06 | (2006.01) |
| B22D 17/02 | (2006.01) |

(Continued)

(52) U.S. Cl.
CPC ............ *B22D 41/06* (2013.01); *B22D 17/02* (2013.01); *B22D 41/01* (2013.01); *B22D 41/04* (2013.01); *B22D 46/00* (2013.01); *B22F 9/08* (2013.01)

(58) Field of Classification Search
CPC ......... B22D 41/04; B22D 41/05; B22D 41/06
See application file for complete search history.

(56) References Cited

U.S. PATENT DOCUMENTS 3,342,250 A * 9/1967 Treppschuh ........ F27D 99/0006
373/16
4,673,025 A 6/1987 Mortimer
(Continued)

FOREIGN PATENT DOCUMENTS

KR 1020150059442 A * 6/2015
KR 1020200127724 A * 11/2020
(Continued)

OTHER PUBLICATIONS

International Application No. PCT/US2022/048306, International Search Report and the Written Opinion of the International Searching Authority, or the Declaration, mail date Feb. 21, 2023, pp. 1-10.

*Primary Examiner* — Kevin E Yoon
(74) *Attorney, Agent, or Firm* — Stephen A. Gratton

(57) ABSTRACT

A tilting melting hearth system (10) includes a tilting melting hearth (12) for melting a metal (14) into a molten metal (16) and a central processing unit (CPU) (18) for controlling the tilting melting hearth (12) having an automated hearth tilting program (20) configured to select a hearth tilt profile based on a weight (66A) of the molten metal (16) in the tilting melting hearth (12). The tilting melting hearth system (10) can also include an atomization die (38) in flow communication with the tilting melting hearth (12) for receiving a stream of molten metal (40) and generating a metal powder (42), or a casting die (46) for generating a casting (48) of the metal (14). The tilting melting hearth system (10) can be used to perform a method for recycling scrap metal by automatically determining the weight of the molten metal (16) in the tilting melting hearth (12).

14 Claims, 7 Drawing Sheets

(51) Int. Cl.
*B22D 41/01* (2006.01)
*B22D 41/04* (2006.01)
*B22D 46/00* (2006.01)
*B22F 9/08* (2006.01)

(56) References Cited

U.S. PATENT DOCUMENTS

| | | | |
|---|---|---|---|
| 5,263,689 A * | 11/1993 | Menzies | B22F 9/08 266/94 |
| 7,503,376 B2 * | 3/2009 | Jackson | F27B 3/19 164/508 |
| 9,925,591 B2 | 3/2018 | Eonta et al. | |
| 10,654,106 B2 | 5/2020 | Eonta et al. | |
| 11,235,389 B2 | 2/2022 | LaTour et al. | |
| 11,541,458 B2 | 1/2023 | Ziegenfuss et al. | |
| 2009/0308562 A1 * | 12/2009 | Rauguth | B22D 41/04 164/121 |
| 2012/0109354 A1 | 5/2012 | Terashima et al. | |
| 2014/0182416 A1 | 7/2014 | Lampson et al. | |
| 2016/0052060 A1 | 2/2016 | Eonta et al. | |
| 2018/0029116 A1 | 2/2018 | Nishida et al. | |
| 2020/0189000 A1 | 6/2020 | Latour et al. | |
| 2021/0008621 A1 | 1/2021 | Eonta et al. | |
| 2021/0031949 A1 | 2/2021 | Bartholomaei et al. | |
| 2021/0237152 A1 | 8/2021 | Doan et al. | |
| 2022/0136769 A1 | 5/2022 | Meese et al. | |
| 2022/0168805 A1 | 6/2022 | LaTour et al. | |

FOREIGN PATENT DOCUMENTS

| | | | |
|---|---|---|---|
| WO | WO-9706060 A1 * | 2/1997 | B22D 37/00 |
| WO | WO-2014174977 A1 * | 10/2014 | B22D 37/00 |

\* cited by examiner

TILTING MELTING HEARTH SYSTEM AND METHOD FOR RECYCLING METAL

CROSS REFERENCE TO RELATED APPLICATION

This application claims priority from U.S. Provisional No. 63/273,291, filed Oct. 29, 2021, which is incorporated herein by reference.

FIELD

This disclosure relates to a system and method of melting, atomizing, or casting recycled scrap material including reactive metals such as titanium, zirconium, nickel, cobalt and their alloys, and nonreactive metals such as steel, iron and their alloys.

This disclosure can be used in any melting process that has a requirement of knowing the volume or weight of the contents of a melting vessel contained in an atmospherically controlled chamber.

BACKGROUND

There is a need in the industry for greater process control in a tilting hearth atomization system, specifically one where the deposition of liquid metal in a gas stream or fixed container are repeatable, and precision amounts are crucial to the process parameters.

The current state of the art with DPA (Direct Pour Atomization) or DPI (Direct Pour Ingot) production requires an amount of molten material to be poured through a calibrated pour notch creating a uniform pour stream into a preferred location in an atomization gas stream, or into a small induction crucible for near net shape, void-free castings. In some systems, the physical window of either target has an approximate diameter of about 0.875" and a preferred diameter of the pour stream of molten metal of about 0.375". Any pouring outside of this window can lead to an ineffective process, a clogged gas die, or a plugged induction mold or crucible. Any variation in the pour stream diameter itself as it interacts with a stable gas stream can lead to variability in a gas to metal ratio, which in turn leads to poor atomization performance.

One additional consideration is that while processing scrap material as feedstock, the variable shape and weight per charge loaded into the hearth can cause differences in the operational parameters preventing formation of a precision pour stream. This in turn leads to variability in processing of the above metals. Those skilled in the art of gas atomization understand that a specific gas-to-metal ratio by weight is desirable and variations from that will create inefficiencies in production yield.

U.S. Pat. Nos. 9,925,591 and 10,654,106, which are incorporated herein by reference, disclose an exemplary metallurgical system that includes a tilting melting hearth system. In this tilting melting hearth system, current operation standards call for the operator to make a judgment based on visual input from the process cameras to determine the fluid level in the tilting melting hearth prior to every pour. The operator must visually judge whether or not the fluid level is correct for the process, and when to start the atomization gas stream that intersects with the molten pour stream. This operator judgment is made up to 20 times per heat. The fluid level has a narrow window of operational parameters where a lesser amount can result in a lack of fluid pressure leading to a short and unstable pouring event. Conversely, an overfill of the hearth can cause a dribble of molten material to build up on the gas die leading to a premature shut down of the atomization or ingot making process. Narrowing the parameters even more are processes in which alloys are being created in the melting hearth via magnetic stirring where melt cycles are defined by energy input per weight of material and a characterized vaporization rate of materials is determined.

The present disclosure is directed to a tilting melting hearth system that overcomes some of the above-described shortcomings of prior art systems. The present disclosure is also directed to a method for recycling metal using the tilting melting hearth system.

SUMMARY

A tilting melting hearth system includes a tilting melting hearth having a melting cavity and a heat source configured to melt a metal into a molten metal, and a pour notch configured to pour the molten metal from the melting cavity. The tilting melting hearth system also includes a central processing unit (CPU) for controlling a hearth tilt angle of the tilting melting hearth and a pour rate from the melting cavity. The central processing unit (CPU) includes an automated hearth tilting program configured to select a hearth tilt profile and to control the hearth tilt angle as a function of the hearth tilt profile and a weight of the molten metal in the tilting melting hearth. The central processing unit (CPU) can also be configured to control a sequence of feeding, melting, pouring and either atomizing or casting the molten metal. The tilting melting hearth system also includes an actuator in signal communication with the central processing unit (CPU) coupled to a linkage configured to support and move the tilting melting hearth to a desired hearth tilt angle. The tilting melting hearth system also includes a weight measuring device operably associated with the actuator in signal communication with the central processing unit (CPU) configured to measure the weight of the molten metal in the melting cavity. The tilting melting hearth system can also include a digital readout in signal communication with the central processing unit (CPU) configured to display data and to provide information to the central processing unit (CPU). The tilting melting hearth system can also include an atomization die in flow communication with the tilting melting hearth configured to receive a stream of molten metal from the pour notch and generate a metal powder comprised of particles having a desired particle shape and particle size. Alternately, the tilting melting hearth system can also include a casting die in flow communication with the tilting melting hearth configured to receive the stream of molten metal from the pour notch and generate a casting of the metal.

The tilting melting hearth system removes the decision-making burden from an operator as to when the fluid level of the molten metal in the tilting melting hearth is correct, which in turn drives a consistency of the process and economy of gas usage. By determining a weight of the molten metal in the tilting melting hearth, and utilizing the automated hearth tilting program, a selection of a hearth tilt profile, or combinations of multiple profiles, can be made. Based on the known density of the metal, and the calculated fluid amount of the molten metal, an entire sequence can be reduced to a single operation. For example, a sequence can include feeding the metal into the tilting melting hearth, melting the metal into the molten metal, and pouring the molten metal into either the atomization die or the casting die. In this example, all aspects of the sequence are controlled by the central processing unit (CPU). The tilting melting hearth system can also provide additional feeding of the metal into the tilting melting hearth, and/or additional pouring into the atomization die or the casting die, to keep the fluid level of the molten metal inside operation parameters.

A method for recycling metal includes the steps of providing a tilting melting hearth system comprising a tilting melting hearth having a heat source and a melting cavity configured to melt a recycled metal into a molten metal, and a pour notch configured to pour the molten metal from the melting cavity. The tilting melting hearth system also includes a central processing unit (CPU) configured to control the tilting melting hearth having a hearth tilting program configured to select a hearth tilt profile as a function of a weight of the molten metal in the tilting melting hearth. The method also includes the steps of determining the weight of the molten material in the tilting melting hearth, selecting a hearth tilt profile using the hearth tilting program, and controlling a hearth tilt angle and a pour rate from the pour notch using the hearth tilt profile and the weight of the molten metal in the tilting melting hearth. The method can also include the steps of controlling a sequence of feeding, melting, pouring and either atomizing and or casting the molten metal, utilizing the hearth tilting program.

DETAILED DESCRIPTION

Figure 1:
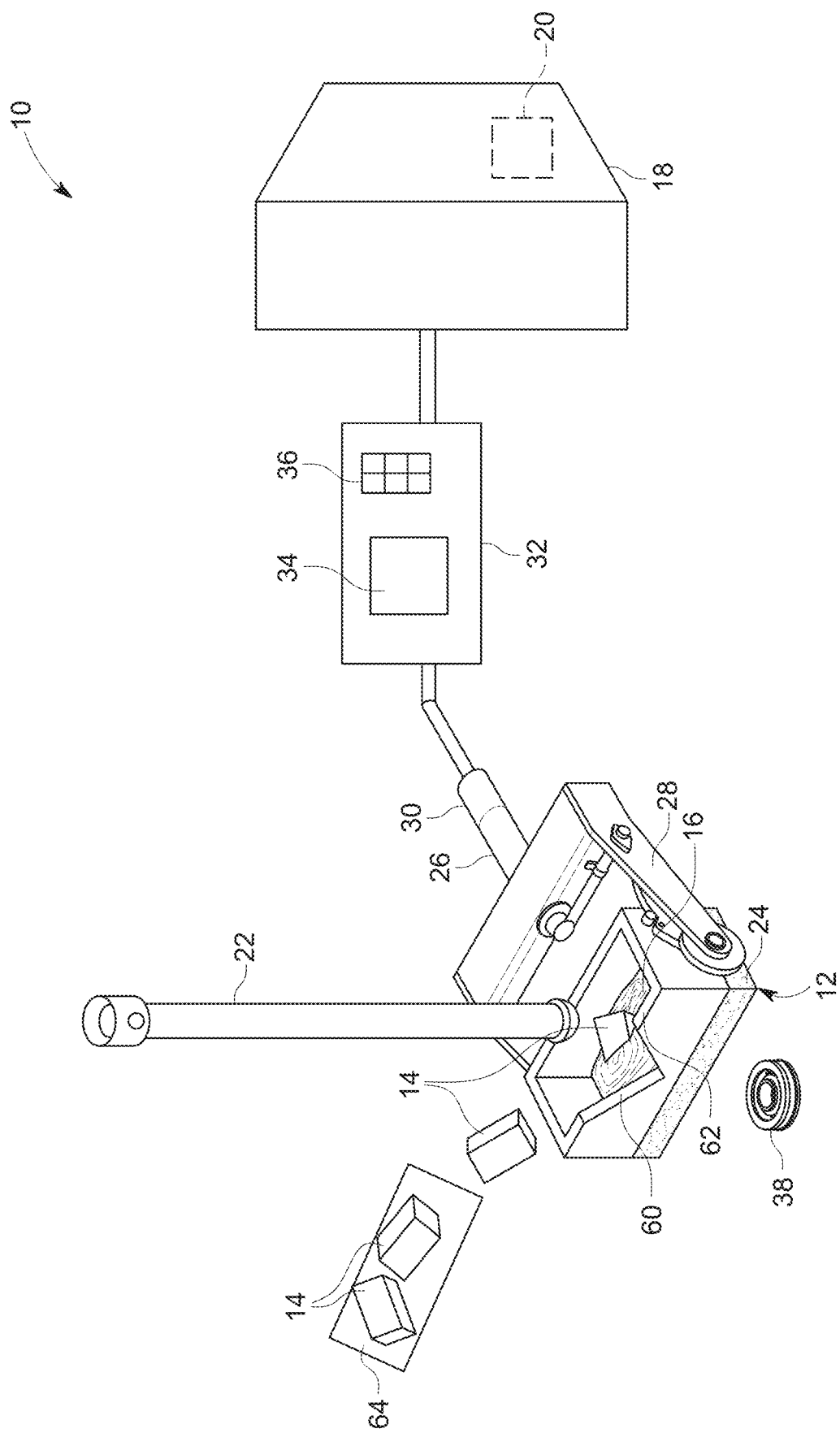
FIG. 1 is a schematic diagram of a tilting melting hearth system.

Referring to FIG. 1, a tilting melting hearth system 10 is illustrated schematically. The tilting melting hearth system 10 includes a tilting melting hearth 12 having a melting cavity 62 configured to melt a metal 14 into a molten metal 16 and a pour notch 60. A feeder 64, such as a tube, channel, or conveyor, in close proximity to the tilting melting hearth 12, feeds the metal 14 into the melting cavity 62. The tiling melting hearth 12 also includes an induction coil 24 configured to heat the molten metal 16 in the melting cavity 62. In addition, the tilting melting hearth system 10 includes an external heat source 22, such as a plasma torch system, a plasma transferred arc system, an electric arc system, an induction system, a photon system, or an electron beam energy system in close proximity to the melting cavity 62 of the tilting melting hearth 12, which is also configured to heat the molten metal 16. The tilting melting hearth system 10 can be configured to form alloys with or without magnetic stirring where melt cycles are defined by energy input per weight of material and a characterized vaporization rate can be determined. Previously cited U.S. Pat. Nos. 9,925,591 and 10,654,106 describe further details of the tilting melting hearth 12 including electromagnetic stirring.

Figure 6A:
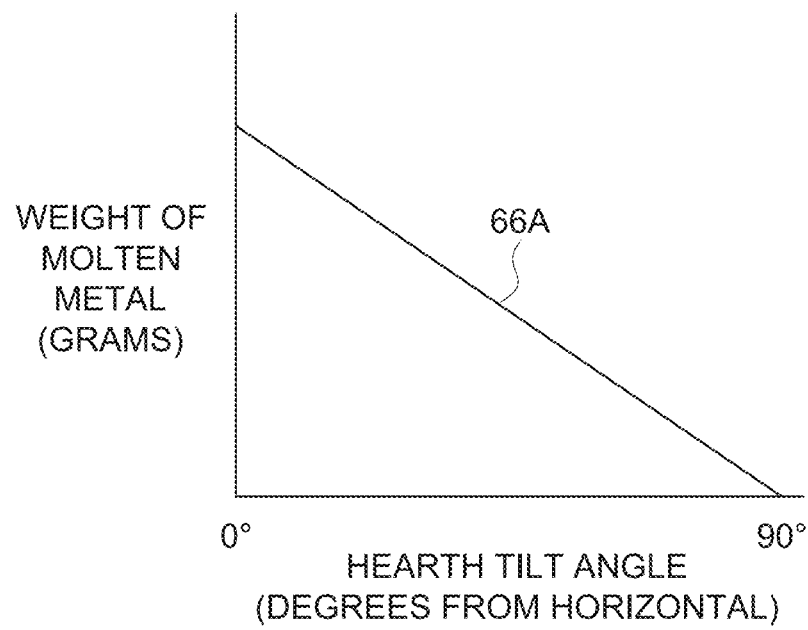
FIG. 6A is a graph illustrating a representative hearth tilt profile for the tilting melting hearth system based on weight of the molten metal.
Figure 6B:
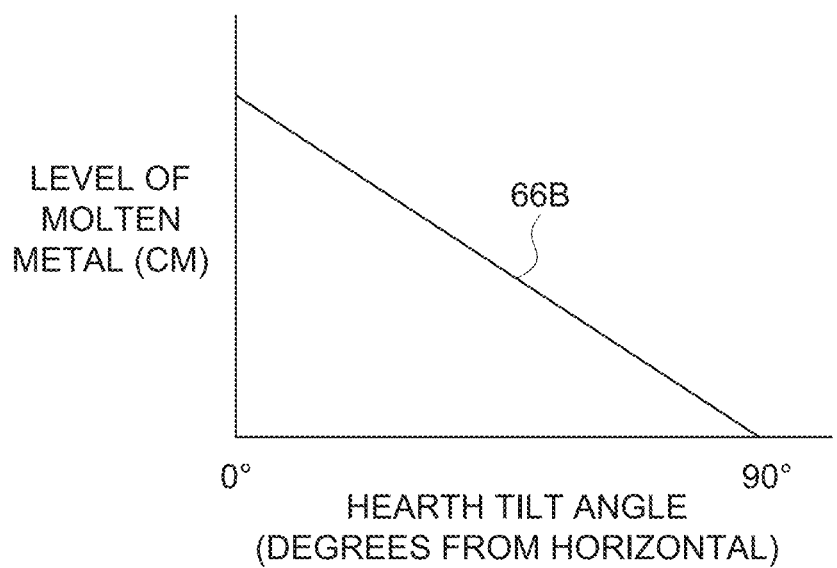
FIG. 6B is a graph illustrating a representative hearth tilt profile for the tilting melting hearth system based on a fluid level of the molten metal in the titling melting hearth.

The tilting melting hearth system 10 also includes a central processing unit (CPU) 18 for controlling the tilting melting hearth 12. As will be further explained, the central processing unit (CPU) 18 includes an automated hearth tilting program 20 configured to maintain one or more hearth tilt profiles 66A (FIG. 6A) or 66B (FIG. 6B). The tilt profiles can be based on a weight or a level of the molten metal 16 in the tilting melting hearth 12, as well as other parameters. The central processing unit (CPU) 18 can also control a sequence of feeding, melting, pouring and either atomizing or casting the molten metal 16. The central processing unit (CPU) 18 can comprise an off the shelf component purchased from a commercial manufacturer. The automated hearth tilting program 20 can include computer code having a set of instructions, or a system of rules, written in a particular programming language (e.g., a source code and an object code). The automated hearth tilting program 20 can be written using techniques that are known in the art and information on the desired hearth tilt profiles 66A (FIG. 6A) or 66B (FIG. 6B).

The tilting melting hearth system 10 also includes an actuator 26 in signal communication with the central processing unit (CPU) 18 having a linkage 28 configured to support and move the tilting melting hearth 12 to a desired hearth tilt angle. The actuator 26 can comprise an off the shelf component, such as a hydraulic cylinder purchased from a commercial manufacturer. The linkage 28 can be fabricated using techniques that are known in the art to perform tilting, as well as rotation about a longitudinal axis. The tilting melting hearth system 10 also includes a weight measuring device 30 operably associated with the actuator 26 in signal communication with the central processing unit (CPU) 18 configured to measure a weight of the molten metal 16 in the tilting melting hearth 12. By way of example, the weight measuring device 30 can comprise a load cell, such as a tension and/or compression load cell, or similar device. The hearth tilting program 20 uses information from the weight measuring device 30 to maintain a desired hearth tilt profile and a uniform pour rate. For example, a hearth tilt profile 66A (FIG. 6A) can be based on the weight of the molten metal 16 in the melting cavity 62. As another example, a hearth tilt profile 66B (FIG. 6B) can be based on the level of the molten metal 16 in the melting cavity 62 as determined by weight, density and volume calculations. These hearth tilt profiles 66A, 66B, as well as others, can be determined using mathematical calculations (and experimental data, if needed) to determine and maintain a uniform stream of molten metal 40 (FIG. 2A) and a uniform pour rate. In addition, multiple profiles can be combined to provide an optimal profile.

The tilting melting hearth system 10 also includes a digital readout 32 in signal communication with the central processing unit (CPU) 18 having a display screen 34 configured to display information and a keypad 36 configured to input information to the central processing unit (CPU) 18. The digital readout 32 can comprise an off the shelf component purchased from a commercial manufacturer.

Figure 3A:
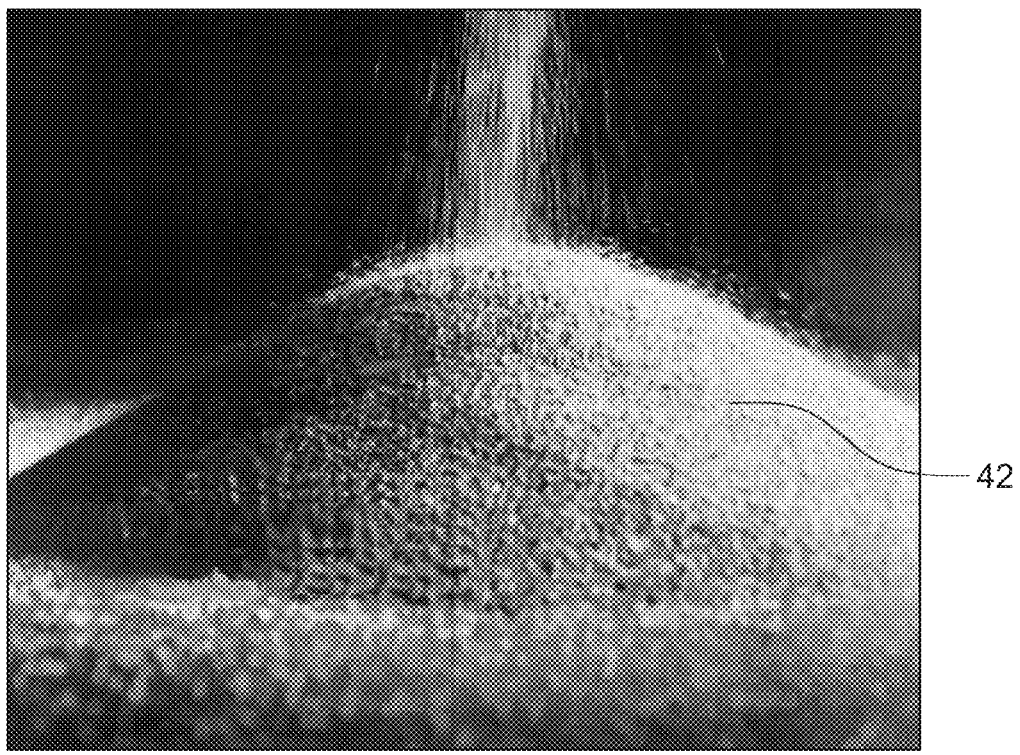
FIG. 3A is a perspective view of a metal powder fabricated using the tilting melting hearth system.
Figure 3B:
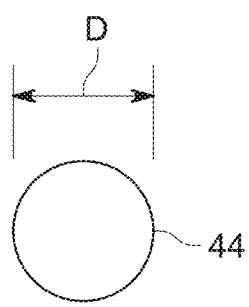
FIG. 3B is an enlarged schematic cross-sectional view of a single metal particle of the metal powder.
Figure 4:
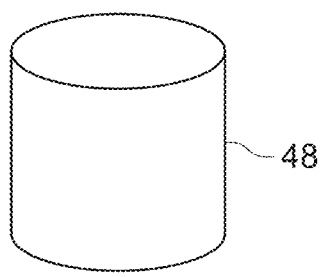
FIG. 4 is a perspective view of a metal casting fabricated using the tilting melting hearth system.

The tilting melting hearth system 10 can also include an atomization die 38 in flow communication with the tilting melting hearth 12 configured to receive the stream of molten metal 40 (FIG. 2A) and generate a metal powder 42 (FIG. 3A) comprised of particles 44 (FIG. 3B) having a desired particle shape and particle size. Alternately, the tilting melting hearth system 10 can also include a casting die 46 (FIG. 2B) in flow communication with the tilting melting hearth 12 configured to receive the stream of molten metal and generate a casting 48 (FIG. 4).

Figure 2A:
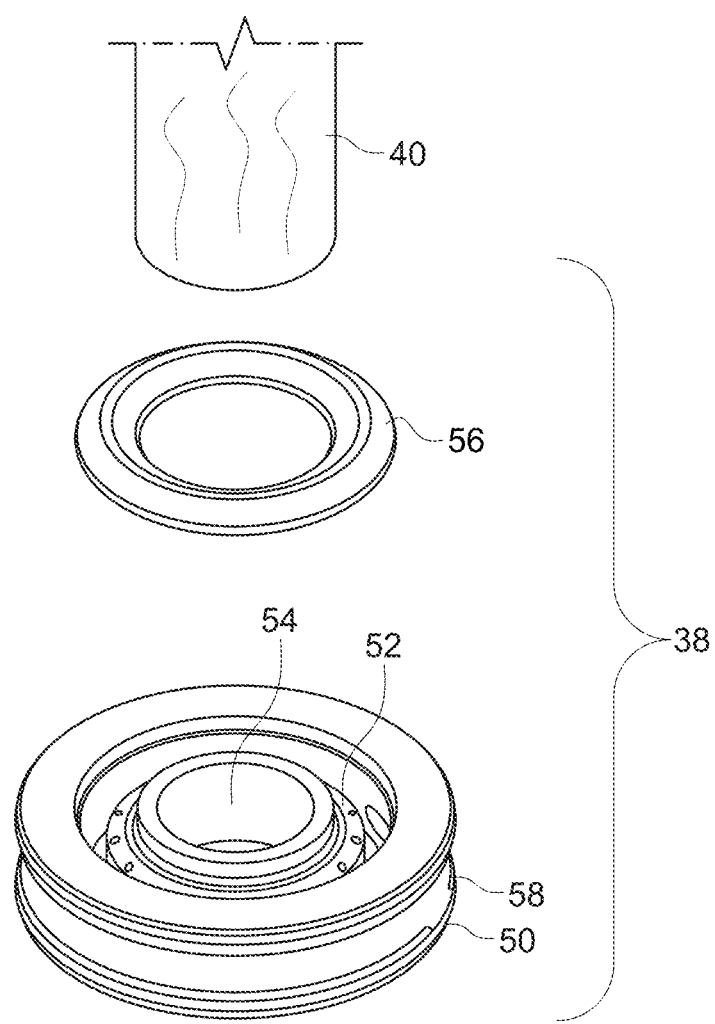
FIG. 2A is a schematic diagram of an atomization die of the tilting melting hearth system.
Figure 2B:
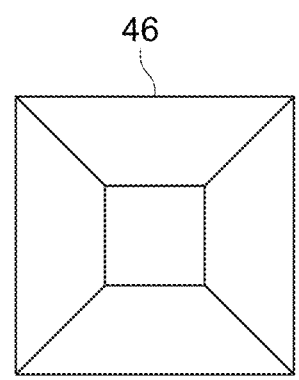
FIG. 2B is a schematic diagram of a casting die of the tilting melting hearth system.

As shown in FIG. 2A, the atomization die 38 can include a metal body 50 having passageways for inert gas jets 52. The atomization die 38 also includes an orifice 54 in the center, a cover 56, and a gas inlet 58. The inert gas jets 52, which are arranged in a circular pattern, impinge inert gas onto the stream of molten metal 40. The inert gas jets 52 all converge on the stream of molten metal 40 within the atomization die 38 to disintegrate the stream of molten metal 40 and generate the metal powder 42 (FIG. 3A) forming the particles 44 (FIG. 3B) with a desired shape (e.g., spherical) and particle size (e.g., diameter D of 1-500 μm). The particles 44 (FIG. 3B) cool in free-fall until reaching the bottom of an atomization tower (not shown). The metal powder 42 (FIG. 3A) is segregated into groups of similar particle size using gravity, screening, or cyclonic separation.

Figure 5:
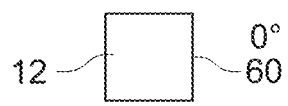
FIG. 5 is a perspective view illustrating different hearth tilt angles for a tilting melting hearth of the tilting melting hearth system.
Figure 5:
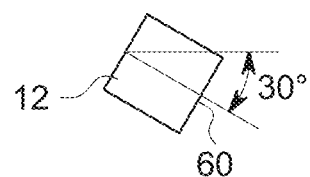
Figure 5:
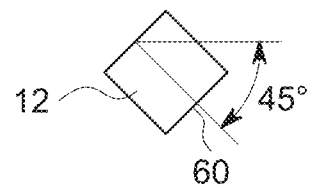
Figure 5:
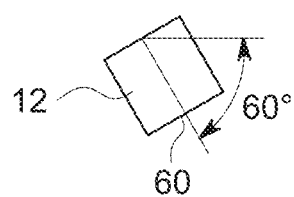
Figure 5:
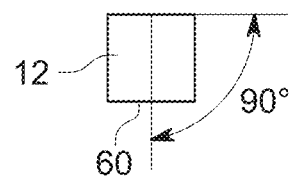

As shown in FIG. 5, the tilting melting hearth 12 can be tilted at different hearth tilt angles from 0 to 90 degrees, measured from a horizontal placement of the tilting melting hearth 12 to pour the molten metal 16 through the pour notch 60 into the atomization die 38 (FIG. 2A) or casting die 46 (FIG. 2B) with a uniform stream of molten metal 40 (FIG. 2A) and a uniform pour rate. By determining a weight of the molten metal 16 in the tilting melting hearth 12, and utilizing the automated hearth tilting program 20, a selection of a hearth tilt profile, or combinations of multiple profiles, can be made. For example, FIG. 6A illustrates the most basic hearth tilt profile 66 in which the hearth tilt angle increases as the weight of the molten metal 16 in the melting cavity 62 of the tilting melting hearth 12 decreases. In this example, the readout of the digital readout 32 can be zeroed to eliminate the weight of the tilting melting hearth 12. In addition, the hearth tilting program 20 controls the tilting melting hearth 12 using angle and time calculations. In addition, different profiles can be used for any segment of the hearth tilt profile 66A, and an interface with the weight measuring device 30. This allows the amount of material in the tilting melting hearth 12 to force a selection of pre-programmed hearth tilt profiles 66A (FIG. 6A) or 66B (FIG. 6B) that best fit the operation parameters.

Figure 7:
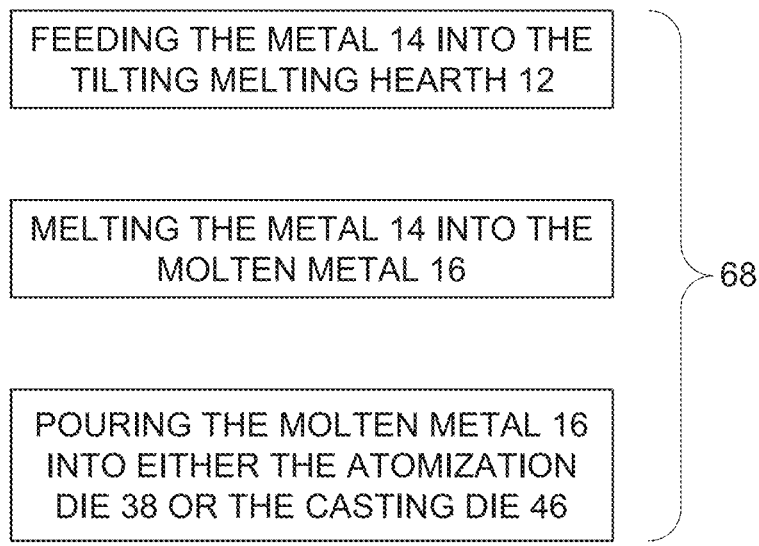
FIG. 7 is a flow chart illustrating a representative operational sequence for the tilting melting hearth system.

Based on the known density of the metal 14, and the calculated fluid amount of the molten metal 16, an entire sequence can be reduced to a single operation. For example, an exemplary sequence 68 shown in FIG. 7, can include feeding the metal 14 into the tilting melting hearth 12, melting the metal 14 into the molten metal 16, and pouring the molten metal 16 into either the atomization die 38 or the casting die 46. In this example, all aspects of the sequence 68 are controlled by the central processing unit (CPU) 18. The tilting melting hearth system 10 can also provide additional feeding of the metal 14 into the tilting melting hearth 12 and/or additional pouring into the atomization die 38 or the casting die 46 to keep the fluid level of the molten metal 16 and the pour rate inside operation parameters. The tilting melting hearth system 10 and the central processing unit (CPU) 18 can also be configured to control electromagnetic stirring of the tilting melting hearth 12 such that a stirring power level can be varied with the amount of molten metal 16 in the tilting melting hearth 12.

The metal 14 can comprise any feedstock, including but not limited to: bars, blocks, rounds, chunks, powders, flakes, pellets or any size or shape that can be fed into a vessel. By way of example, recycled scrap metals can include reactive metals such as titanium, zirconium, nickel, cobalt and alloys thereof. As another example, recycled scrap metals can include nonreactive metals, such as steel, iron and alloys thereof. In an exemplary embodiment, scrap metals can be collected from a battlefield near a forward operating base. In another embodiment, parts can be recycled on board an aircraft carrier, oil rig, or some other remote facility. Preferably, large pieces of scrap metal are collected, analyzed by handheld XRF, and cut to pieces smaller than 6" in diameter. Smaller fragments of scrap metals are preferably not collected due to lower yield, greater variations in alloy composition, and increased likelihood of contamination.

Example. The operational range of Ti 6-4 and other material of the same density can be approximately 5.5 kg to 7 kg of pre-alloyed material (e.g., metal 14 (FIG. 1)) in the tilting melting hearth 12. Effective alloy producing amounts requiring stirring can be approximately 3.5 kg to 4 kg. This illustrates that in practice the volume of material required to produce alloy from raw material, or to correct any composition of an alloy, is much more narrow than processing pre-alloyed material. The operation of adjusting the composition of an alloy by either adding virgin material or elevating individual constituents requires the same process control as creating an initial alloy from raw constituents. Hence there is a need to identify a precise amount of material in the tilting melting hearth 12.

While a number of exemplary aspects and embodiment have been discussed above, those of skill in the art will recognize certain modification, permutations, addition, and sub-combinations thereof. It is therefore intended that the following appended claims and claims hereafter introduced are interpreted to include all such modifications, permutations, additions, and sub-combinations as are within their true spirit and scope.

What is claimed:

1. A tilting melting hearth system comprising:
a tilting melting hearth having a melting cavity and a heat source configured to melt a metal into a molten metal and a pour notch configured to pour the molten metal from the melting cavity;
a central processing unit (CPU) having a program configured to select a hearth tilt profile, to control a hearth tilt angle of the tilting melting hearth and to maintain the hearth tilt profile to provide a uniform pour rate;
an actuator in signal communication with the central processing unit (CPU) coupled to a linkage connected to the tilting melting hearth, the actuator and the linkage configured to support and move the tilting melting hearth to a desired hearth tilt angle to maintain the hearth tilt profile and the uniform pour rate; and
a weight measuring device connected to the actuator in signal communication with the central processing unit (CPU) configured to measure a weight of the molten metal in the tilting melting hearth and to provide information to the central processing unit (CPU) to maintain the hearth tilt profile and the uniform pour rate.

2. The tilting melting hearth system of claim 1 further comprising a digital readout in signal communication with the central processing unit (CPU) configured to display data and to provide information to the central processing unit (CPU).

3. The tilting melting hearth system of claim 1 further comprising an atomization die in flow communication with the tilting melting hearth configured to receive a stream of molten metal from the pour notch and to generate a metal powder comprised of particles having a desired particle shape and particle size, the central processing unit (CPU) configured to provide a uniform stream of the molten metal to the atomization die.

4. The tilting melting hearth system of claim 1 wherein the program is comprises an automated hearth tilting program configured to provide the central processing unit (CPU) with information for controlling a sequence that includes feeding the metal into the tilting melting hearth, melting the metal into the molten metal, and pouring the molten metal from the melting cavity.

5. The tilting melting hearth system of claim 1 wherein the program and the central processing unit (CPU) are configured to control the tilting melting hearth to form alloys having a uniform composition.

6. The tilting melting hearth system of claim 1 wherein the metal has a density and a volume and the program is configured to calculate a level of the molten metal in the melting cavity using the density and the volume.

7. The tilting melting hearth system of claim 1 wherein the metal comprises recycled scrap metal that has been analyzed and cut into pieces.

8. A tilting melting hearth system comprising:
a tilting melting hearth having a melting cavity and a heat source configured to melt a metal into a molten metal, and a pour notch configured to pour the molten metal from the melting cavity;
a central processing unit (CPU) configured to control the tilting melting hearth, the central processing unit (CPU) comprising an automated hearth tilting program configured to select a hearth tilt profile and to control a hearth tilt angle as a function of the hearth tilt profile to provide a uniform pour rate, the program configured to maintain the hearth tilt profile and the uniform pour rate using weight, density and volume calculations of the molten metal;
an actuator in signal communication with the central processing unit (CPU) coupled to a linkage connected to the tilting melting hearth configured to support and move the tilting melting hearth to a desired hearth tilt angle determined by the program to maintain the hearth tilt profile and the uniform pour rate;
a weight measuring device connected to the actuator in signal communication with the central processing unit (CPU) configured to measure the weight of the molten metal in the tilting melting hearth; and
a digital readout in signal communication with the central processing unit (CPU) configured to display data and to provide information to the central processing unit (CPU).

9. The tilting melting hearth system of claim 8 further comprising an atomization die in flow communication with the tilting melting hearth configured to receive a stream of molten metal from the pour notch and to generate a metal powder comprised of particles having a desired particle shape and particle size, the central processing unit (CPU) configured to provide a uniform stream of the molten metal to the atomization die.

10. The tilting melting hearth system of claim 8 wherein the weight of material in the tilting melting hearth forces a selection of pre-programmed hearth tilt profiles that best fit operation parameters.

11. The tilting melting hearth system of claim 8 wherein the tilting melting hearth is configured to melt a feedstock including having a known composition and a desired size and shape.

12. The tilting melting hearth system of claim 8 wherein the metal comprises analyzed recycled scrap metal.

13. The tilting melting hearth system of claim 8 wherein the central processing unit (CPU) is includes a hearth tilting program configured to control a sequence that includes feeding the metal into the tilting melting hearth, melting the metal into the molten metal, and pouring the molten metal as a function of a position of the tilting melting hearth.

14. The tilting melting hearth system of claim 8 wherein the central processing unit (CPU) is configured to control electromagnetic stirring of the tilting melting hearth such that a stirring power level can be varied with an amount of the molten metal in the tilting melting hearth.

* * * * *